May 19, 1964  E. W. BENSON  3,133,374
FISH HOOK SUPPORTING DEVICE
Filed Nov. 17, 1959

INVENTOR.
Elliot W. Benson
BY
*Maguire*
ATTORNEY

United States Patent Office 3,133,374
Patented May 19, 1964

3,133,374
FISH HOOK SUPPORTING DEVICE
Elliot W. Benson, 17 Center St., Mount Vernon, N.Y.
Filed Nov. 17, 1959, Ser. No. 853,540
2 Claims. (Cl. 43—57.5)

This invention relates in general to a supporting device for a fish hook and more particularly to a device for the support of a fly type fish hook.

The main object of the invention is to provide a fly type fish hook supporting device easy to manufacture; and of few parts, low cost, and durable construction.

A further object is to provide a supporting device of the character described so constructed and arranged as to permit the fly hook to be readily attached thereto and detached therefrom and to maintain the fly hook firmly in position and the hackles of the fly free from distortion or crushing.

In accordance with the invention, the fly hook supporting device comprises a pair of opposed resilient arms, with each arm having a free end portion bent inwardly toward the other arm then reversely outwardly. The arms are spaced apart a distance close enough to permit engagement of the bend and eye of the hook by the bent portions of the arms and to place the fly hook under tension when so engaged. The opposite end of each arm is secured to a supporting surface, with each arm positioned so that the hackles of the fly are maintained clear of the supporting surface.

The various features of novelty which characterize my invention are pointed out with particularity in the claims annexed to and forming a part of this specification. For a better understanding of the invention, its operating advantages and specific objects attained by its use, reference should be had to the accompanying drawings and descriptive matter in which I have illustrated and described a preferred embodiment of my invention.

In the drawings.

Like characters of reference refer to the same or similar parts throughout the several views.

Figure 1:
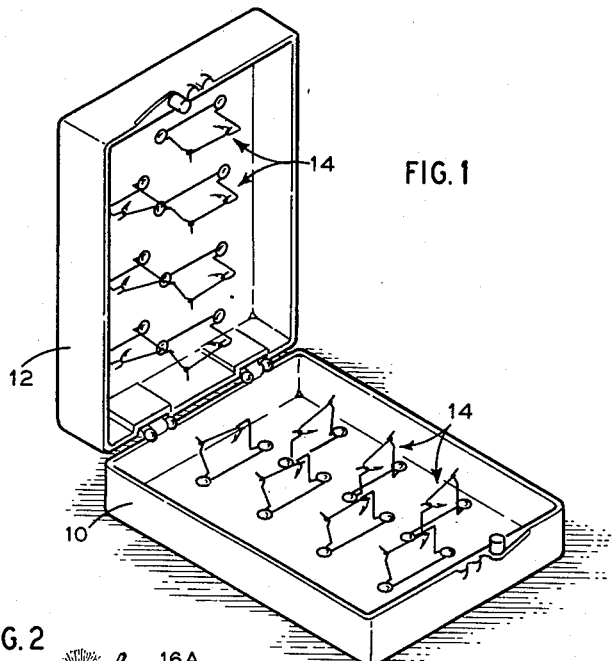
FIG. 1 is a perspective view of a fly box embodying the invention.

In the drawings the invention is embodied in a plastic box or container 10 having a cover 12 hinged thereto, with fly type fish hook supporting devices 14 arranged in staggered rows along the bottom of the box 10 and the inside of the cover 12. The supporting devices in the box and cover respectively extend in opposite directions so that on closing of the cover the devices in the box occupy a portion of the spaces between the devices in the cover and the devices in the cover occupy a portion of the spaces between the devices in the box, thereby permitting a large number of devices to be mounted.

While the following description pertains to the form and mounting of a supporting device in the box 10, it is to be understood that the supporting devices in the cover 12 are similarly formed and mounted.

Figure 2:
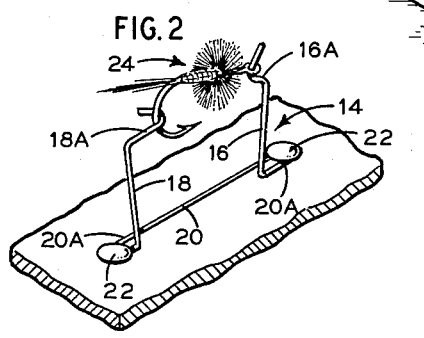
FIG. 2 is a perspective view of one of the fly type fish hook supporting devices shown in FIG. 1.
Figure 4:
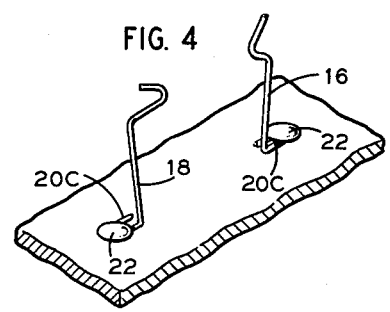
FIG. 4 is another modified form of the device shown in FIG. 2.
Figure 3:
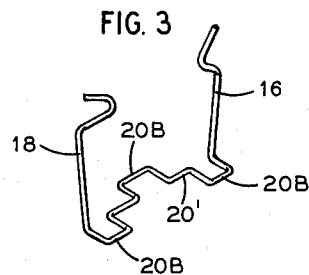
FIG. 3 is a modified form of the device shown in FIG. 2.

As shown in FIG. 2, each supporting device 14 comprises a resilient piano wire element of U-shaped formation having a pair of opposed substantially parallel arms 16 and 18 of about the same length extending upwardly from and substantially normal to the bottom of the container 10 and a cross-piece 20 extending across and immediately adjacent to the bottom of the box and formed at its opposite ends with reversely looped portions 20A extending to the lower end of the arms 16 and 18. Each device is secured to the bottom of the box by pins 22 extending through the looped portions 20A of the cross-piece 20. As alternatives for the support of the devices, the intermediate portion of the cross-piece 20' may be formed with oppositely extending loops 20B for securement by pins to the bottom of the box, as shown in FIG. 3; or the ends of the arms 16 and 18 adjacent the bottom of the box may be formed with loops 20C for securement by pins 22 to the bottom of the box, as shown in FIG. 4. The arm 16 has a V-shaped free end portion 16A bent upwardly and inwardly with respect to the arm 18, and then reversely outwardly and upwardly. The other arm 18 has a V-shaped free end portion 18A bent inwardly with respect to the arm 16 and substantially parallel to the bottom of the box and then reversely outwardly and substantially parallel to the bottom of the box. The arms 16 and 18 are spaced apart a distance close enough to permit engagement of the curved portion of a fly hook 24 by the apex of the V-shaped portion 18A of the arm and of the eye of the fly hook by the apex of the V-shaped portion 16A of the arm 16; and to place the fly hook under tension when so engaged. With this arrangement the fly hook 24 is firmly secured in position and positively restrained against slipping down along the arms 16 and 18; and the delicate hackles of the fly are maintained clear of the supporting surface of the box, thereby preventing distortion or crushing of the hackles. The fly hook may be readily disengaged by merely pushing the arm 18 inwardly to free the curved portion of the hook, and then detaching the eye of the hook from the arm 16.

Figure 5:
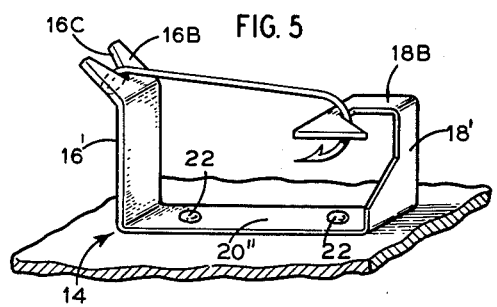
FIG. 5 is a perspective view of still another modified form of the device of the invention.

In the modification of the invention shown in FIG. 5, the fly hook supporting device is made of resilient plastic material of U-shaped formation and of substantially rectangular cross-section in most part. The arms 16' and 18' are connected by the cross-piece 20'', with the arm 16' having a free end portion 16B bent upwardly and outwardly with respect to the arm 18' and formed with a V-shaped notch 16C and the arm 18' having a free end portion 18B of V-shaped formation extending inwardly toward the arm 16' and parallel to the cross-piece 20''. The device is secured to the supporting surface by pins 22 extending through the cross-piece 20''. Similar to the first described embodiment, the arms 16' and 18' are spaced apart a distance close enough to allow engagement of the curved portion of the fly hook by the apex of the V-shaped portion 18B of the arm 18' and wedging of the eye of the fly hook in the apex of the V-shaped notch 16C; and to place the hook under tension when thus engaged.

While the invention has been illustrated and described in connection with a fly box, it will be understood that the fly hook supporting devices may be secured in a manner similar to that described to a fisherman's hat, cap or belt, or to other types of tackle boxes.

While in accordance with the provisions of the statutes I have illustrated and described herein the best form of the invention now known to me, those skilled in the art will understand that changes may be made in the form of the device disclosed without departing from the spirit of the invention covered by my claims, and that certain features of the invention may sometimes be used without a corresponding use of other features.

What is claimed is:

1. A device for use in supporting a fly hook having an eye and a curved hook portion, said device comprising a one-piece substantially U-shaped member providing a pair of opposed arms connected by a cross arm, both of said opposed arms being resilient along their entire lengths, means forming a supporting surface for said arms, each of said arms having a V-shaped free end portion with the bend of the V-shaped portion of one arm adapted to interlock with and fix firmly and be partially enclosed by the curved portion of the fly hook and the bend of the V-shaped portion of the other arm adapted to interlock with and fix firmly and be encircled by the eye of the fly hook, said V-shaped portion of said one arm extending in a plane parallel to said supporting surface and said V-shaped portion of the other arm extending in a plane normal to said supporting surface, said cross arm having looped portions at its opposite ends connected to said opposed arms, and means securing said looped portions of said cross arm to said surface and maintaining the opposed arms substantially normal to said surface so that the fly of said hook is maintained clear of said surface, said opposed arms being spaced apart a distance close enough to permit engagement of the hook and eye of the fly hook by the bends of the V-shaped portions of said arms and to place the fly hook under tension when so engaged, thereby preventing sliding movement of the fly hook.

2. A device for use in supporting a fish hook having an eye and a curved hook portion, said device comprising a one-piece substantially U-shaped member providing a pair of opposed resilient arms connected by a cross arm, means forming a supporting surface for said arms, one of said opposed arms having a free end portion extending parallel to said supporting surface and bent inwardly with respect to the other opposed arm and then reversely outwardly to form an outwardly facing loop, adapted to interlock with and fix firmly the curved portion of the fish hook, the other of said opposed arms having a free end portion bent outwardly with respect to said one arm and formed with a V-shaped notch adapted to engage and fix firmly the eye of the fish hook, and means securing said cross arm to said surface and maintaining the opposed arms substantially normal to said surface so that the fish hook is maintained clear of said surface, said opposed arms being spaced apart a distance close enough to permit engagement of the hook of the fish hook by the loop of the free end portion of said one arm and of the eye of the fish hook by the V-shaped notch of said other arm and to place the fish hook under tension when so engaged, thereby preventing sliding movement of the fish hook.

References Cited in the file of this patent

UNITED STATES PATENTS

| | | |
|---|---|---|
| 1,957,352 | Patricoski | May 1, 1934 |
| 2,209,609 | Odom | July 30, 1940 |
| 2,602,258 | Elko | July 8, 1952 |

FOREIGN PATENTS

| | | |
|---|---|---|
| 698,318 | Great Britain | Oct. 14, 1953 |
| 782,515 | Great Britain | Sept. 11, 1959 |